United States Patent [19]

Stanton

[11] Patent Number: 5,056,180
[45] Date of Patent: Oct. 15, 1991

[54] FIELD TAPE CLEANING AND LUBRICATING DEVICE

[76] Inventor: Timothy F. Stanton, 332 Maple St., Danvers, Mass. 01923

[21] Appl. No.: 364,464

[22] Filed: Jun. 12, 1989

[51] Int. Cl.$^5$ .......................................... F01M 11/12
[52] U.S. Cl. .................................. 15/118; 15/104.74; 15/210 B
[58] Field of Search ................ 184/92; 15/210 B, 118, 15/105

[56]  References Cited

U.S. PATENT DOCUMENTS

| | | | |
|---|---|---|---|
| 1,168,478 | 1/1916 | Carter | 184/92 |
| 1,876,744 | 9/1932 | Posgate | 15/210 B |
| 2,140,426 | 12/1938 | Hodson | 15/210 B |
| 2,207,487 | 7/1940 | Kirkpatrick | 15/210 B |
| 2,504,563 | 4/1950 | Menke | 15/210 B |
| 2,739,338 | 3/1956 | Weeks | 15/210 B |
| 4,031,853 | 6/1977 | Conrad | 15/210 B |
| 4,422,204 | 12/1983 | Long, Jr. | 15/210 B |
| 4,498,558 | 2/1985 | Bendahan | 15/210 B |

*Primary Examiner*—Harvey C. Hornsby
*Assistant Examiner*—Patrick Brinson
*Attorney, Agent, or Firm*—Donald N. Halgren

[57] ABSTRACT

The present invention comprises a field tape cleaning and adjustable lubricating device with a split housing that opens to receive a tape. The device includes serial array of chambers, with an arrangement of pads located in a front chamber to scrape the heavy dirt from the tape before the tape is pulled through the device. A pair of elongated pads are biased against each side of the tape from a middle chamber in the housing. An articulable container holding a sponge is pivotable within a third chamber, towards and away from a tape pullable therepast, for selectively dispensing a lubricant thereagainst.

7 Claims, 32 Drawing Sheets

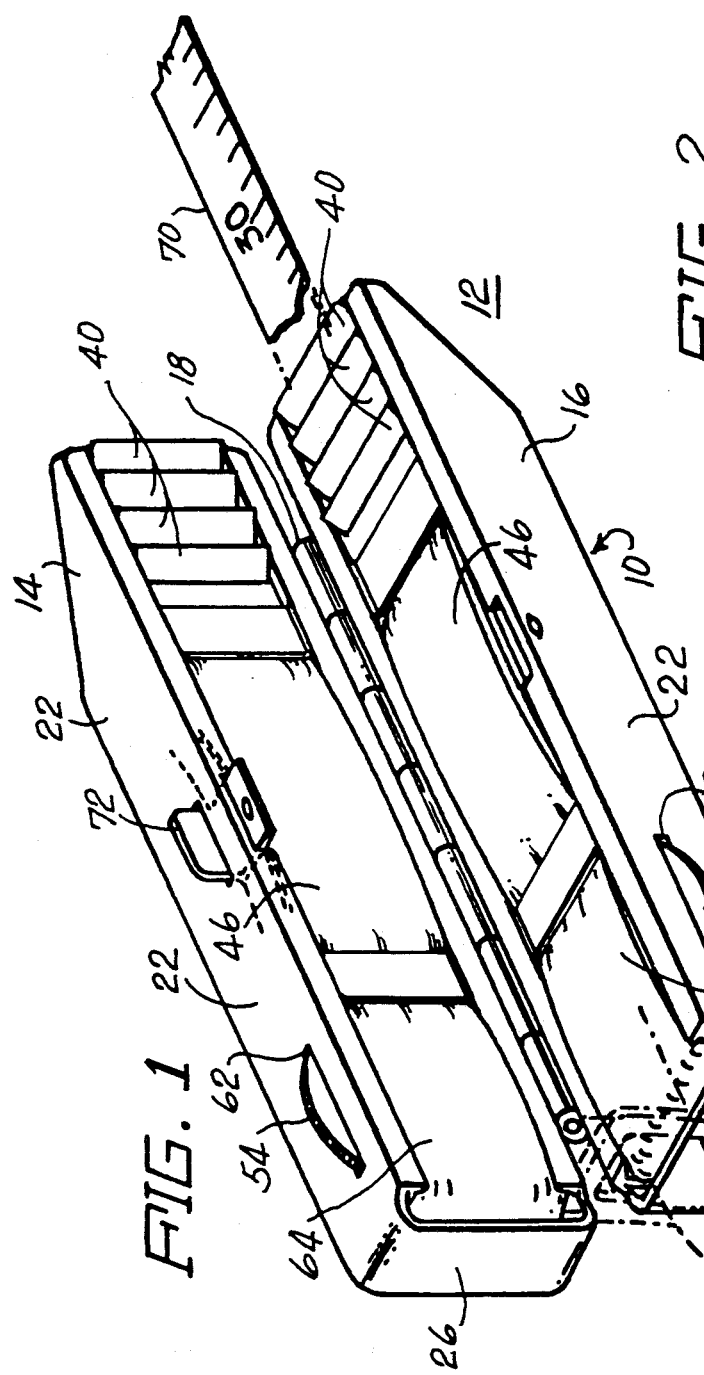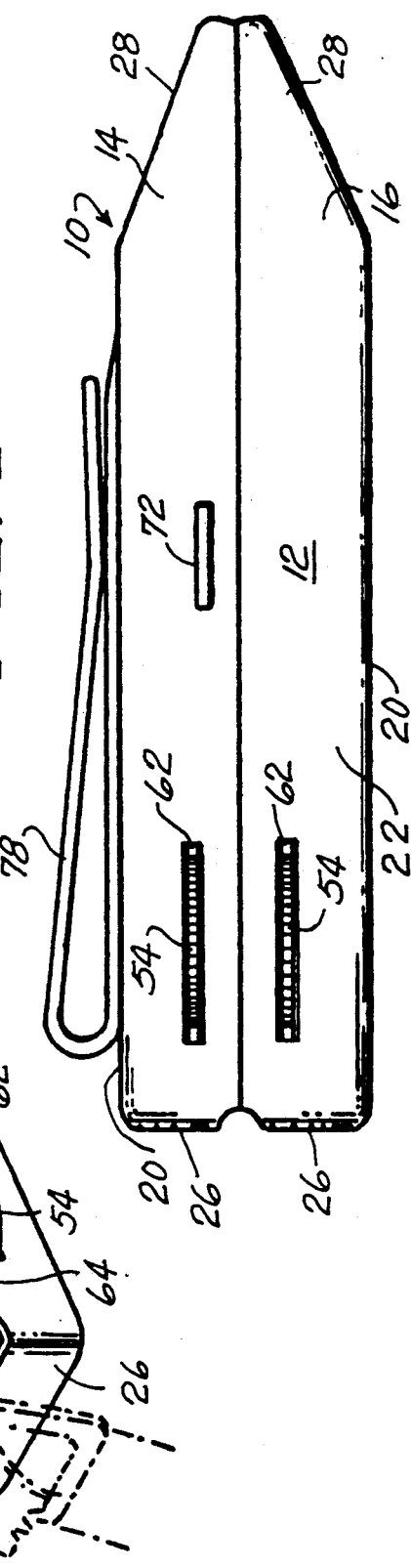

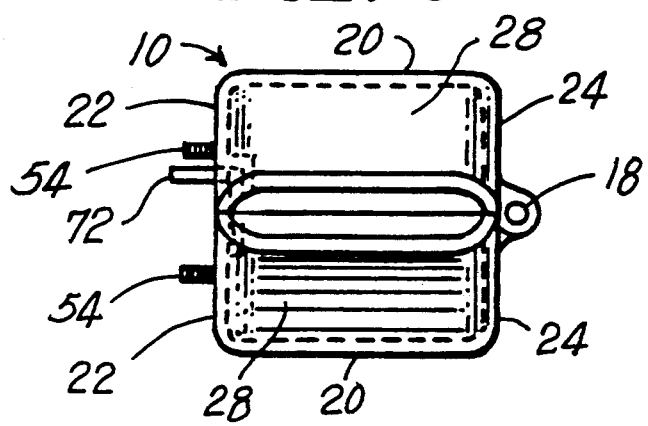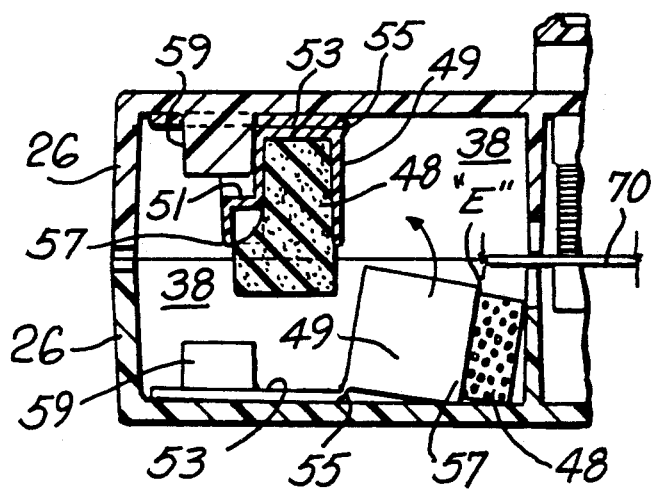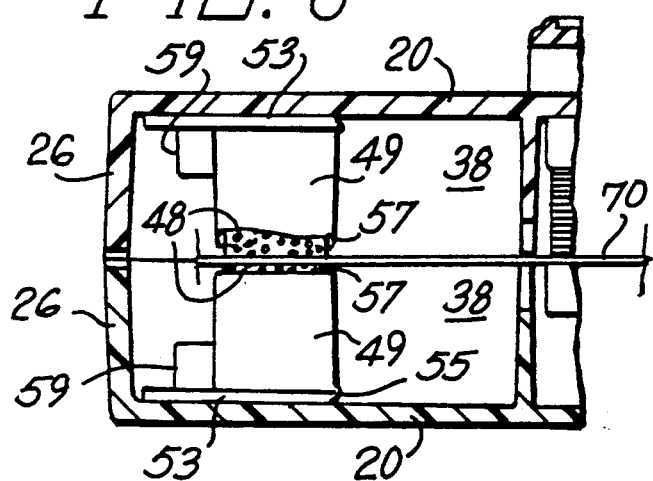

FIELD TAPE CLEANING AND LUBRICATING DEVICE

BACKGROUND OF THE INVENTION (1) Field of the Invention

This invention relates to tape measure devices, and more particularly, to cleaning and lubricating devices for field tape measures.

(2) Prior Art

Using spirally wound tape measures is a common means by which engineers, contractors, surveyors and construction personnel determine distances, often in outdoor terrain. Conditions are often muddy, grimey and/or wet. The tapes themselves are dragged through these conditions as they are unwound from and rewound onto their hubs.

Mud, debris and moisture will collect upon the tape as it is pulled along. Several attempts have been made to clean the tapes but none are known to clean and controllably lubricate successfully.

Information Disclosure Statement: Examples of these attempts include U.S. Pat. 1,876,744 to Postgate which discloses a pair of hinged flanges which each have a pad to wipe and lubricate a tape pulled therebetween. U.S. Pat. No. 2,424,046 to Moore et al discloses a cleaning device which is secured to a tape reel with rollers that remove oil from a vertically oriented tape pulled from an oil tank. U.S. Pat. No. 2,779,045 shows a line wiper in combination with a plumb bob for cleaning the tape line as it is pulled from a liquid holding tank. Similarly, U.S. Pat. No. 2,157,024 to Smith shows a gauge line wiper with a plumb bob for wiping a tape pulled up from a tank.

U.S. Pat. No. 2,662,700 to Higgins shows a tape reel with a pair of wiper rolls and a brake, to clean and control the windspeed of a tape. U.S. Pat. No. 2,035,379 to Stewart discloses a pair of wiper blocks attached to a frame extending from a tape reel to clean a tape pulled therebetween. Finally, U.S. Pat. No. 1,987,264 to McMahan discloses a tape reel with a pair of resilient blocks attached to a hinged frame secured to the reel frame. The hinged frame is manually pivotable to wipe oil from a tape as it is reeled therepast. None of these patents disclose a tape cleaning and selective lubrication device that permits the convenience of operation of Applicant's invention.

It is an object of the present invention to overcome the limitations of the prior art to provide a combination device which may be utilized as a wiping means as well as a regulable lubricating device.

It is further object of the present invention to provide a tape cleaning and lubricating device which may be simply and easily cleaned and refreshened in the field, by its user.

BRIEF SUMMARY OF THE INVENTION

The present invention comprises a cleaning and controllable lubricating device utilizable with a field tape measure. The cleaning and controllable lubricating device comprises an elongated housing divided into a first half and a second half, the halves being attached to one another along a common longitudinal side thereof.

Each housing half is essentially a mirror duplicate of the other housing half. The lower housing half comprises an elongated member having a bottom wall, a pair of side walls, a rear end wall generally normal to the bottom wall, and a front edge wall diagonally disposed with respect to the bottom wall, to define a container, open on one side thereof.

A pair of partitions are disposed transversely across each container, to serially define a first front chamber, a second middle chamber, and a third rear chamber.

A plurality of tough, fibrous scraper pads are disposed in overlapping relationship, generally parallel to the front edge wall, in the first chamber. In the middle chamber, a biasing means is disposed against the inside of the bottom wall, which presses against a platform. A plurality of elongated, soft, fibrous wiper pads are layered on the platform.

The rear chamber contains an absorbent, sponge-like member which may be filled with a lubricating fluid. In one embodiment, the sponge-like member may be disposed in and extend outwardly beyond the distalmost edge of the pivotable container. The pivotable container has a hinge-like flap which is secured to the bottom wall of each housing, (or the inside of the top wall of the top half of the housing). Pivoting of the container in one direction swings the sponge into a perpendicular orientation with respect to the tape brought therepast, for lubrication thereof. Pivoting of the container down into the housing pivots the sponge out of the pathway of a tape brought therepast. The pivoting is performed by manually pressing the upper edge of the container in the direction that the user wishes the sponge-like member to be disposed in.

In another embodiment of the lubricant dispensing means, a plate covers the sponge-like member filling the rear chamber. An opening is centrally disposed through the cover plate. A disc is rotatably disposed on the cover plate. The disc has an opening therethrough which is alignable with the opening in the cover plate. The disc has a knurled periphery which extends slightly through a slot in a side wall of the housing. A sponge-like lubricating pad is disposed adjacent the cover plate and disc.

In operation of the device, a tape from an unwound field tape reel is placed between the open first and second halves, which are then closed and latched by the clip lock arranged therebetween.

As the tape is rewound on the reel, the end wall of the device is caused to butt against the reel, and the tape is pulled through the device. The scraper pads, angled sharply with respect to any incoming tape so as to resist buckling, scrape off crusted debris from the tape moving between them (the other pads in the other housing) in their respective housing halves. The tape is next caused to be wiped by the biased wiper pads disposed in the middle chamber in each of the housing halves.

Downstream, in the third or rear chamber, the tape may be lubricated by the lubricating pad on either, neither or both sides of the tape moving therebetween, if the respective containers have been pivoted into or away from the tape pathway or alternatively, in another embodiment, if the cover plates have been rotated to expose their lubricant engorged sponges thereadjacent, depending upon the decision of the user.

The wiper pads may be pulled off from one another, as the outermost ones become dirty. The scraper pads and the lubricating sponge or pad may be changed regularly as well, as they are held in place only by frictional engagement with their chamber and container, respectively, in the prefered embodiment. A belt clip may be attached to the outside of the bottom wall of one of the halves to facilitate ease of carrying and use thereof.

BRIEF DESCRIPTION OF THE DRAWINGS

The objects and advantages of the present invention will become more apparent when viewed in conjunction with the following drawings in which:

FIG. 1 is a perspective view of the cleaning and lubricating device, with its (upper and lower) halves in their open or tape receiving orientation, with one of the lubricating means shown therein;

FIG. 2 is a side elevational view of the device, with both halves of the housing disposed against one another in its closed configuration;

FIG. 5 is a view taken along the lines V—V of FIG. 3, showing the end of the housing where a tape would enter therein;

FIG. 6 is a view of the preferred means of lubricating the tape, with a lubricating sponge arrangement disposed in its tape engaged orientation; and FIG. 7 is a view of the tape lubricating means shown in FIG. 6, with one side of the lubricating sponge arrangement being disposed in a non-engaging orientation.

DESCRIPTION OF THE PREFERRED EMBODIMENTS

Figure 3:
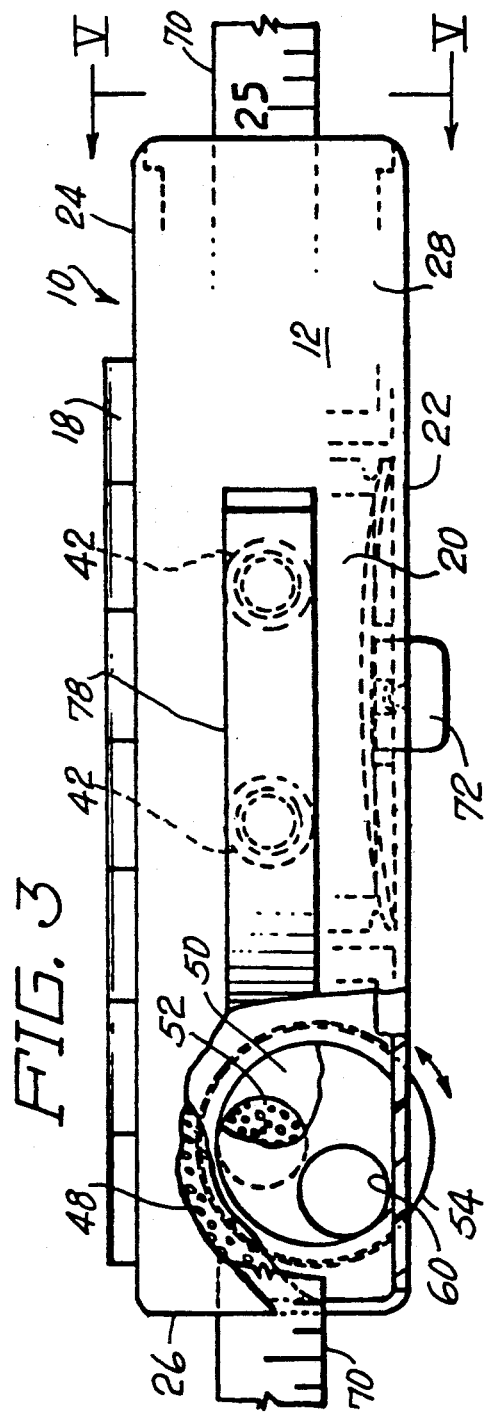
FIG. 3 is a plan view of the device in its closed tape-engaged condition with portions of the tape cut away for ease of viewing, showing one of the embodiments for lubricating the tape.

Referring to the figures in detail and particularly to FIG. 1, there is shown in FIG. 1 a tape cleaning and controlled lubricating device 10, comprising an elongated housing 12 having a first half 14 and a second half 16 (upper and lower halves as shown in the drawings). The halves 12 and 14 are pivotably attached to one another by an elongated hinge 18, the halves 12 and 14 being identical to one another, except as described hereinafter.

The (exemplary) second half 16, is an elongated member having a bottom wall 20, a pair of side walls 22 add 24, a rear end wall 26 normal to the bottom wall 20, and a front edge wall 28 disposed diagonally with respect to the bottom wall 20, to define a container having one elongated portion generally open.

Figure 4:
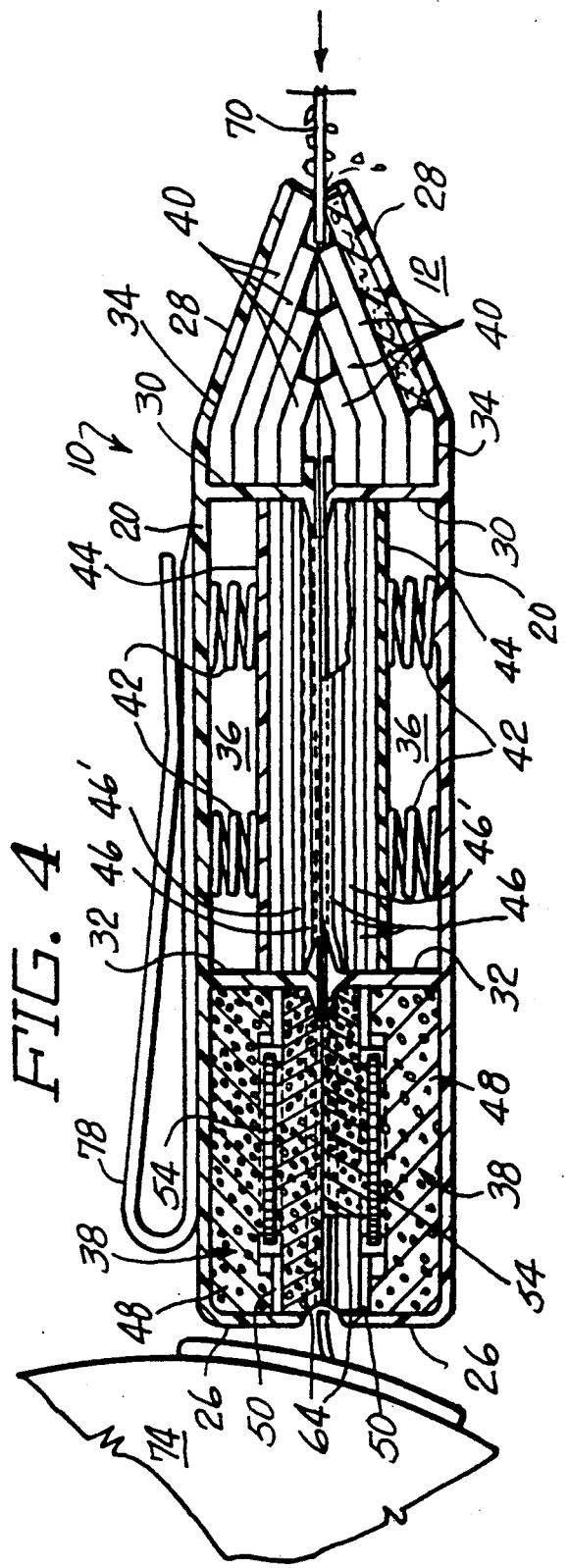
FIG. 4 is a side elevational view, with portions of the side cut away, showing the biasing means and one of the lubricating means in section.

A pair of partitions 30 and 32 are disposed transversely across each container, as shown in FIG. 4, to serially define in each container, a first or front chamber 34, a second or middle chamber 36 and a third or rear chamber 38.

A plurality of tough, fibrous scraper pads 40 are disposed in an overlapping relationship, in the front chamber 34, generally parallel to the front edge wall 28 as shown in FIGS. 1 and 4. In the middle chamber 36, a biasing means 42 such as a plurality of coil springs or leaf springs or their equivalent, may be arranged therein, disposed against the inside of the bottom wall 20. The biasing means 42 press against a platform 44. A plurality of elongated, soft, fibrous wiper pads 46, are removably layered on the platform 44, biased away from the bottom wall 20.

The rear chamber 38 contains an absorbent sponge-like member 48 which acts like a reservoir, engorged with a lubricating fluid. In the preferred embodiment of the lubricating means, the sponge-like member 48, shown in FIGS. 6 and 7, is disposed in a container 49 of box-like shape having a detent 51 to provide a step-like configuration therein. A lower hinge plate 53 is secured to the inside of the bottom wall 20 of the third chamber 38. The hinge plate 53 is pivotably secured to one lower edge 55 of the container 49. The container 49 has a distal periphal edge 57. The sponge 48 extends from within the container 49, beyond the distal edge 57 thereof. When it is desired to lubricate a tape, the container 49 is manually pressed at its swingable edge marked "E" in FIGS. 6 and 7, to pivot the container 49 about its lower edge 55 to snap the detent 51 onto the receiving stem 59 on the hinge plate 53. This permits the sponge 48, in this embodiment, to be disposed in the pathway of any tape pulled therepast. Pivoting of the container 49 into the third chamber 38, as shown in FIG. 7 causes the sponge to be held out of the way of any tape, and fully within its respective third chamber 38.

In another embodiment, a plate 50 covers the sponge-like member 48, enclosing it in the rear chamber 38. An opening 52 is arranged through the cover plate 50, and may be centrally disposed thereon, as shown in FIG. 3. A disc 54 is rotatably disposed on or may be received in a circumferential track means; not shown, disposed on the cover plate 50. An opening 60 is disposed through the disc 54. The disc 54 also has a knurled peripheral edge. A slot 62 is disposed through one side wall 24, as shown in FIGS. 1, 2 and 5. An arcuate portion of the disc 54 extends through the slit 62 in the housing.

A sponge-like lubricating pad 64 is disposed on the cover plate 50 and disc 54. Rotation of the disc 54 by pushing upon the knurled periphery thereof, will effectuate alignment or non alignment of the opening 60 in the disc 54 with the opening 52 in the cover plate 50.

As an unwound field tape 70 is placed between the open first and second halves 14 and 16, which is then closed and locked thereabout, by a clip lock 72, the tape 70 may be rewound on its reel 74. The end wall 26 may be caused to butt against the reel 74, as the tape 70 is pulled through the cleaning and selective lubricating device. The scraper pads 40 are arranged to initiate the removal of debris from the tape 70 being pulled therepast. The tape 70 is subsequently caused to be wiped still cleaner yet by the elongated wiper pads 46 biased thereagainst by the biasing means 42.

Downstream, in the rear chamber 38, the tape 70 may be lubricated (on both sides), only one side being described herewith, by the lubricating pad 64, if the opening 60 in the rotatable disc 54 is in alignment with the opening 52 in the cover plate 50 on which the disc 54 rotates, lubricating fluid may be excreted therethrough, and soak the lubricating pad 64, to lubricate, if desired, the tape being pulled therepast. Any of the pads 40, 46, or 64 may be readily removed and replaced, or expose a fresh pad (46') thereadjacent.

A belt clip 78 may be attached to one of the outside walls 20, as shown in FIGS. 2 and 4, further facilitate ease of use of this device.

I claim:

1. A portable hand held field tape cleaning and selective lubrication device, comprising;
    a housing having first and second portions hingedly attached to one another;
    a serially disposed array of chambers in each housing portion arranged for performing successive operations on a tape pulled therebetween, including:

the first of said chambers containing a scraping means to remove chunks of debris as the tape enters the housing;

the second of said chambers containing a plurality of elongated removable wiper pads, said elongated pads being biased towards a tape pulled therepast, by biasing means also disposed within said chamber, between said elongated pads and said housing;

the last of said chambers containing an articulable lubricating sponge; and wherein said sponge is disposed in a container means, said container means being disposed in said chamber in said housing to permit pivoting thereof from a first retracted position to hold said sponge out of engagement with a tape, to a second upright orientation perpendicular to and in engagement with a tape thereadjacent.

2. A field tape cleaning and selective lubricating device as recited in claim 1 wherein said container has a hinge thereattached and said hinge has a stem which engages a stepped member of said container to hold said container and sponge in a tape engageable orientation.

3. A portable field tape cleaning and selective lubrication device, comprising:

a housing having first and second portions hingedly attached to one another;

a serially disposed array of chambers in each housing portion arranged for performing successive operations on a tape pulled therethrough, including:

the first of said chambers container a scraping means to remove chunks of debris as the tape enters the housing;

the second of said chambers containing a removable wiper pad, said pad being biased towards a tape pulled therepast by biasing means also disposed in said chamber, between said pad and said housing; and a last of said chambers containing an adjustable lubricating means arranged therein, to controllably disperse lubricant on a tape being pulled therepast;

comprising a lubrication reservoir which is communicable with a lubricating pad by a regulatable orifice means which permits communication therebetween.

4. A field tape cleaning and selective lubricating device as recited in claim 3, wherein said regulatable orifice means comprises a rotatable disc having an opening therein, which disc is rotatably mounted on a cover plate which encloses said lubricating means in said chamber, said cover plate having an opening therein, alignment of said openings, effectuating communication of lubricant between said reservoir and said lubricating pad, for facilitating said selective lubrication of a tape pulled therepast.

5. A portable hand-held cleaning and lubricating device for a field tape, comprising;

an openable housing having a first half and a second half, each half having a plurality of tape cleaning or lubricating means arranged therein;

each half having a first chamber with a pad means therein to remove large debris from any tape pulled therepast;

each half also including an intermediate or middle chamber having a cleanser pad arrangement together with a biasing means arranged within said chamber so as to press said pad arrangement against any tape being moved therepast;

each half also including a rear chamber having controllable lubrication means for dispersing or witholding lubrication with respect to any tape moving therepast; and wherein said controllable lubricating means comprises a container pivotable with respect to said chamber in its respective half of said housing, said container having an absorbable member carried therein, and extending therefrom, wherein pivotable movement of said container in said chamber effectuates movement of said absorbable member into and away from any tape pulled therepast.

6. A cleaning and lubricating device for a fielf tape as recited in claim 5, wherein said chambers are arranged serially, said lubricating means being disposed at the end of the series.

7. A cleaning and lubricating device for a field tape as recited in claim 5, wherein said biasing means comprises a spring means arranged between said housing and said pad arrangement.

* * * * *